United States Patent
Giraud

(10) Patent No.: US 11,273,798 B2
(45) Date of Patent: Mar. 15, 2022

(54) DEVICE FOR CLEANING A SENSOR OF AN OPTICAL DETECTION SYSTEM FOR A MOTOR VEHICLE

(71) Applicant: Valeo Systèmes d'Essuyage, Le Mesnil Saint Denis (FR)

(72) Inventor: Frédéric Giraud, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 163 days.

(21) Appl. No.: 16/094,096

(22) PCT Filed: Mar. 23, 2017

(86) PCT No.: PCT/EP2017/056911
§ 371 (c)(1),
(2) Date: Oct. 16, 2018

(87) PCT Pub. No.: WO2017/182224
PCT Pub. Date: Oct. 26, 2017

(65) Prior Publication Data
US 2019/0106086 A1    Apr. 11, 2019

(30) Foreign Application Priority Data
Apr. 21, 2016 (FR) ...................... 1653517

(51) Int. Cl.
*B60S 1/56* (2006.01)
*G02B 27/00* (2006.01)
(Continued)

(52) U.S. Cl.
CPC .................. *B60S 1/56* (2013.01); *B60Q 9/00* (2013.01); *B60S 1/0848* (2013.01); *B60S 1/48* (2013.01); *G02B 27/0006* (2013.01)

(58) Field of Classification Search
CPC . B60S 1/56; B60S 1/0848; B60S 1/48; B60Q 9/00; G02B 27/0006
See application file for complete search history.

(56) References Cited

U.S. PATENT DOCUMENTS

| | | | |
|---|---|---|---|
| 2010/0085171 A1* | 4/2010 | Do | G08B 25/08 340/426.1 |
| 2014/0270379 A1* | 9/2014 | Snider | B60R 1/00 382/104 |

(Continued)

FOREIGN PATENT DOCUMENTS

| | | |
|---|---|---|
| CN | 104044558 A | 9/2014 |
| CN | 104470771 A | 3/2015 |

(Continued)

OTHER PUBLICATIONS

International Search Report in corresponding International Application No. PCT/EP2017/056911, dated May 22, 2017 (5 pages).

(Continued)

*Primary Examiner* — Thomas E Worden
(74) *Attorney, Agent, or Firm* — Osha Bergman Watanabe & Burton LLP

(57) ABSTRACT

The invention relates to a device for cleaning a sensor (2) of an optical detection system for a motor vehicle, comprising a fluid distribution set (3) for distributing fluid onto said sensor under the control of operating instructions issued by a control module (6). According to the invention, the control module is configured to generate an information message (M1) about the need for the sensor to be cleaned and to receive a control instruction from a vehicle occupant authorizing the cleaning operation.

13 Claims, 2 Drawing Sheets

(51) Int. Cl.
*B60S 1/08* (2006.01)
*B60Q 9/00* (2006.01)
*B60S 1/48* (2006.01)

(56) References Cited

U.S. PATENT DOCUMENTS

| | | |
|---|---|---|
| 2016/0101735 A1 | 4/2016 | Trebouet |
| 2016/0178376 A1* | 6/2016 | Moore .................. G08G 1/143 |
| | | 701/532 |
| 2017/0197636 A1* | 7/2017 | Beauvais ................ G06F 3/167 |
| 2020/0198444 A1* | 6/2020 | Schmidt ................ B60H 1/008 |

FOREIGN PATENT DOCUMENTS

| | | |
|---|---|---|
| CN | 104822568 A | 8/2015 |
| EP | 2 873 572 A1 | 5/2015 |
| WO | 2014/086760 A1 | 6/2014 |

OTHER PUBLICATIONS

Written Opinion in corresponding International Application No. PCT/EP2017/056911, dated May 22, 2017 (9 pages).
The First Office Action issued in corresponding Chinese Application No. 201780025108 8, dated Jan. 5, 2021 (12 pages).

* cited by examiner

DEVICE FOR CLEANING A SENSOR OF AN OPTICAL DETECTION SYSTEM FOR A MOTOR VEHICLE

The field of the present invention is that of optical detection systems that are used in particular to assist in the driving of motor vehicles that use optical sensors. In this field, the invention relates more particularly to devices for cleaning the sensors of these optical devices.

Optical detection system is the name given to any system including optical sensors, such as cameras, laser sensors (commonly called LIDARs) or other sensors based on the emission and/or the detection of light in the spectrum visible or invisible to humans, in particular the infrared.

Such optical detection systems are being fitted on an increasingly large number of motor vehicles in order to assist the driver of the vehicle in certain driving situations, one of which that is well known being parking assistance. In order for this assistance to be as effective as possible, the data supplied by the optical detection system have to be of the best possible quality, and it is therefore essential to have clean optical systems to perform these data acquisitions. To this end, it is known to situate a cleaning device in the vicinity of these optical sensors, which cleaning device is able to project a cleaning fluid just before the detection is performed.

As such sensors are more often than not hidden from the direct view of the driver of the vehicle, their cleaning is ordered automatically, for example with a predefined periodicity. The problem that then arises is that of the time at which this cleaning operation will be performed, and it may be the case that it takes place at a disadvantageous time with regard to a particular driving situation. It is readily understood, for example, that it is inappropriate for a cleaning operation for the lens of a parking assistance camera to be ordered at the moment when the driver is currently undertaking a parking maneuver or has engaged a reverse gear. Although, in the case of parking assistance, the drawback may be merely a simple inconvenience, there are cases in which, depending on the type of sensor under consideration, the impromptu triggering of a cleaning operation therefor may lead to a driving situation that could potentially cause an accident. Moreover, and in particular in the case of automatic triggering of the cleaning while the vehicle is traveling at high speed, there is a risk of drops of the cleaning liquid being projected into the driver's field of vision, and of this representing a dangerous distraction from the driving the vehicle.

The aim of the present invention falls within this context, and it provides a solution in which the cleaning of a sensor of such an optical detection assembly is not able to be initiated in an impromptu manner or in a manner that is able to lead to a driving situation that could potentially cause an accident.

To this end, one subject of the invention is a device for cleaning a sensor of an optical detection system for a motor vehicle, which comprises an assembly for distributing fluid onto said sensor that is driven by operating instructions sent by a control module. According to the invention, the control module is configured to generate an information message relating to the need for a cleaning operation for the sensor and to receive a control instruction from an occupant of the vehicle who authorizes this cleaning operation.

Thus, the invention provides that the initiation of a cleaning operation for such a sensor is subject to prior authorization from the driver of the vehicle.

According to various features of the invention, taken alone or in combination, it may be provided that:

the device includes means for detecting the presence of foreign bodies on the sensor, which means are configured to send, to the control module, an item of data relating to the need for a cleaning operation for the optical sensor;

the control module is configured to communicate with signaling means that are able to generate said information message in the passenger compartment of the vehicle;

the device includes means for recognizing the control instruction from an occupant of the vehicle, which means are configured to communicate with the control module and transmit to it an item of data relating to the authorization of the cleaning operation;

the recognition means are activated by the control module at the same time as the sending of said information message;

the recognition means include a button that is able to be actuated by an occupant of the vehicle;

the recognition means include gesture and/or voice recognition means;

the fluid distribution assembly is configured to move between a rest position and a working position in which the cleaning fluid is distributed onto a surface of the sensor;

the device includes means for monitoring one or more driving parameters of the vehicle, which means are configured to generate an item of data representative of the driving situation of this vehicle and to communicate this item of data to the control module;

the control module is configured to generate, following a control instruction from the occupant of the vehicle, a plurality of cleaning cycles by way of the fluid distribution assembly, sequentially or at predefined time intervals;

the control module is configured to generate, following a control instruction from the occupant of the vehicle, one or more cleaning cycles until the vehicle comes to a complete stop.

In practice, the device for cleaning a sensor of an optical detection system is often coupled to a device for cleaning at least one front and/or rear glazed surface of the vehicle. According to the invention, in this case, the control module may furthermore be configured to drive the operation of an assembly for cleaning at least one front and/or rear glazed surface of the vehicle. There may be provision for a fluid storage tank shared with the assembly for cleaning at least one glazed surface, and there may be provision for means for monitoring a fluid level in this tank, which means are configured to communicate with the control module. Moreover, it may be provided that the control module includes means for selectively controlling the device for cleaning the optical sensor and/or the assembly for cleaning at least one glazed surface, depending on a predefined first value of the fluid level in the storage tank.

In other words, in this case, the cleaning of the sensor of the optical detection system may be ordered on its own, with priority over the cleaning of the front and/or rear glazed surface(s) of the vehicle. In this case, according to one advantageous feature of the invention, the control module is configured to enable the display, in the passenger compartment, of a message representative of the fluid level in the storage tank and of the cleaning operation performed.

The invention also relates to a motor vehicle including an optical detection system and an associated cleaning device able to clean the optical sensor of this detection system. It may be provided in particular that the control module is positioned anywhere in the vehicle, whereas the signaling means and the recognition means, as they have been presented above, are positioned in the passenger compartment of the vehicle.

The invention also relates to a method for cleaning a sensor of an optical detection system for a motor vehicle, wherein a fluid distribution assembly is moved between a rest position and a working position in which the fluid is able to be distributed onto a surface of the sensor, during which there is provided a step of detecting possible dirt on this surface of the sensor, a step of generating a signal representative of the presence of possible dirt on the surface of the optical sensor, a step of displaying, in the passenger compartment of the vehicle, a message representative of the presence of possible dirt on the surface of the optical sensor, a step of recognition of an order, by a user situated in the passenger compartment of the vehicle, on the basis of the message displayed in the passenger compartment, authorizing a cleaning operation for the sensor, and a step of activating the fluid distribution assembly.

According to particular features of this method according to the invention, there may be provided:

a step of generating an item of data representative of the driving situation of the vehicle, said step of activating the fluid distribution assembly being conditional upon the value of this item of data, and/or a step of monitoring the level of a shared storage tank for a fluid for cleaning a front and/or rear glazed surface of the vehicle and for cleaning the sensor, and a step of generating an item of data representative of this fluid level in this storage tank, said step of activating the fluid distribution assembly being conditional upon the value of this item of data.

Other features, details and advantages of the invention will become more clearly apparent from reading the description given hereinafter by way of illustration and with reference to the appended figures, in which.

The invention will be described in the following text with regard to the non-exclusive application thereof to an optical detection system comprising an optical sensor 1 equipped with a lens 2. The invention will therefore be described in this case through a device for cleaning the lens 2 of this optical sensor.

Figure 1:
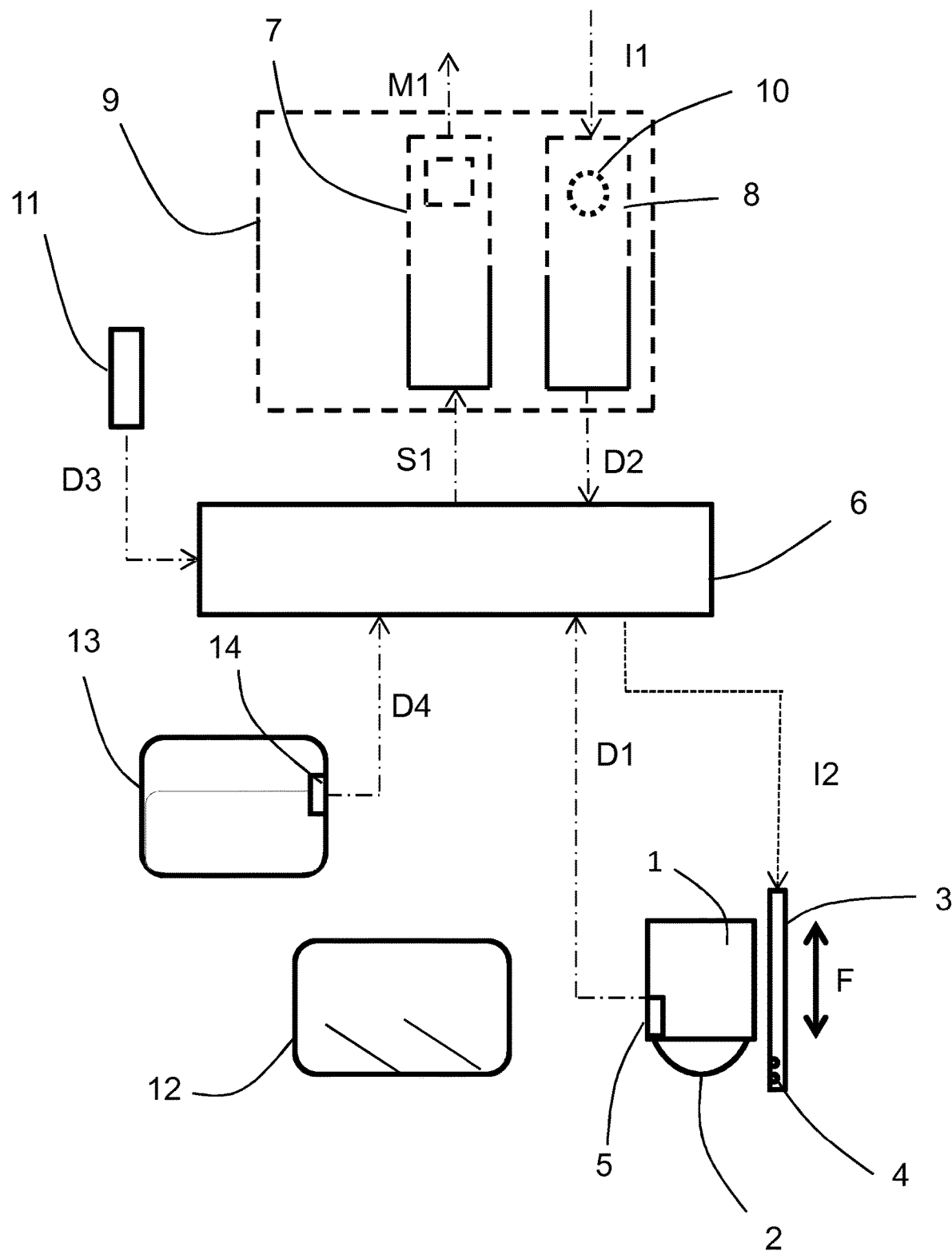
FIG. 1 is a schematic overview of a cleaning device according to the invention.

Such a cleaning device comprises a fluid distribution assembly 3, which is in this case mobile between a rest position and a working position in a direction that is shown schematically by the double-headed arrow F visible in FIG. 1. This fluid distribution assembly 3 includes, in particular, a set of distribution nozzles 4 by way of which one or more cleaning and/or drying fluids may be projected. In the working position of the cleaning device according to the invention, illustrated more particularly by FIG. 1, the distribution nozzles 4 are situated such that they project this fluid or these fluids onto the outer surface of the lens 2, thus making it possible to remove possible smears and/or dirt therefrom that could disrupt the detection by the optical sensor 1, for example the capturing of images by a camera. The cleaning fluid is projected when the fluid distribution assembly 3 is in its working position, and the projection of the cleaning fluid may be followed by a projection of a drying fluid, so as to eliminate any smear or residue that the cleaning fluid might leave. In the rest position, not shown in this case, of such a cleaning device, the fluid distribution assembly 3 is situated set back from the surface of the lens 2, and no fluid is projected by the distribution nozzles 4. Thus, in the case illustrated, it may be considered that the cleaning operation for the lens 2 consists of the sequence of a first step of moving the fluid distribution assembly 3 between a rest position and a working position, and then a second step of projecting cleaning fluid.

The optical sensor 1 is equipped with detection means 5 that are able to generate a signal representative of the presence of possible foreign bodies, such as dust, debris or other types of dirt, on the surface of the lens 2. These detection means are configured to communicate with a control module 6, in particular so as to be able to transmit a first item of data D1 representative of the presence of possible foreign bodies on the surface of the lens 2 to this control module.

The control module 6 is configured to receive a first item of data D1 originating from the detection means associated with the optical sensor to be cleaned, as has just been explained, on the one hand, and to send a first signal S1 to the signaling means 7 that are able to deliver, into the passenger compartment of the vehicle, an information message M1 to the occupants of the vehicle that is representative of this first signal, on the other hand.

Moreover, the control module 6 is configured to receive a response to this first signal S1 in the form of a second item of data D2 originating from means 8 for recognizing a control instruction I1 from the driver, so as to order a cleaning operation for the optical sensor, that is to say in the present case a movement of the fluid distribution assembly between a rest position and a working position and a projection of cleaning liquid onto the lens of the sensor.

It is understood that the control module 6 may extend to any area of the vehicle and that the signaling means 7 and the recognition means 8 are positioned inside the passenger compartment 9, shown schematically in broken lines in FIG. 1.

The signaling means 7 are configured to deliver, into the passenger compartment 9, an information message M1 representative of the presence of possible foreign bodies on the surface of the lens 2.

These signaling means 7 may include a screen, in particular a screen also used by a management and control assembly of the vehicle of on-board computer type, on which the information message M1 may consist of words that signal the need to clean the optical sensor. It may also be provided to turn on an indicator light on the dashboard of the vehicle, or else to deliver an audio message into the passenger compartment.

The recognition means 8 may include a detection camera for gesture-based recognition of a movement of the user, or they may take the form of voice recognition means for recognizing an oral instruction from the user. They may also consist of a button 10 that the driver is invited to maneuver when he wishes to act on the device for cleaning the optical sensor, in particular after viewing the information message M1.

According to features of the invention that are specific to the operation of the recognition means, such that stray instructions do not negatively affect the performance of the system, it is provided that the recognition means 8 for triggering an order, from the passenger compartment, to perform a cleaning operation for the optical detection system are active only when the information message M1 representative of the presence of possible foreign bodies on the surface of the optical sensor takes a predefined value. This is useful in particular when the recognition means consist of voice and/or gesture recognition means, so as to avoid them being turned on constantly.

Plus, it is possible to contemplate a period of time after the information message M1 has been delivered, within which the control instruction has to be formulated by the driver or any other occupant of the vehicle in order for it to be taken into account by the recognition means and by the control module.

The control module is able to generate a second control instruction 12 destined for the fluid distribution assembly 3, so that the associated actuator generates the movement of the fluid distribution nozzles and the projection of liquid toward the optical sensor.

Figure 2:
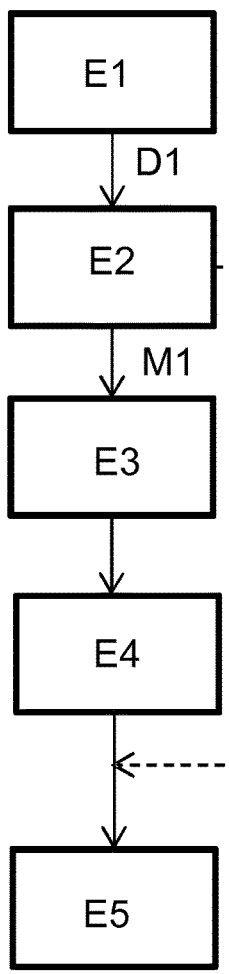
FIG. 2 is a schematic view, in the form of a flowchart, of a cleaning method according to the invention.

In other words, and with reference in particular to the flowchart of FIG. 2, the method for cleaning an optical sensor according to the invention begins when foreign bodies are detected by the detection means 5 on the surface of the lens 2 (step E1), an item of data D1 representative of this presence then being transmitted to the control module 6, which analyzes this first item of data so as to generate an information message to be passed on to the users in the passenger compartment (step E2). The control module communicates with the signaling means 7 that are housed in the passenger compartment so as to broadcast this information message M1 representative of the item of data D1 (step E3), the type of information message being able to depend on the urgency of the information to be communicated and/or on the preferences set by the user. By way of example, urgent messages relating for example to the complete soiling of the sensor may be relayed both by a visual medium and by an audio message, whereas preventive advance messages, relating for example to beginning of soiling of the optical sensor, may be delivered only in the form of written messages if the driver does not wish to receive voice messages in his passenger compartment. In response to this information message M1, the driver or any other occupant of the vehicle may or may not decide to perform cleaning of the optical sensor, in particular depending on his appreciation of the driving situation and of the potential inconvenience that this cleaning could entail in this situation, and he may, within an appropriate period, perform a control instruction (step E4) able to be recognized by the recognition means 8 in order to initiate an operation of cleaning the optical sensor (step E5) via driving of the control module 6.

According to various embodiments, once the cleaning operation for the lens or, more generally, for the optical sensor 2 has been ordered from the passenger compartment, this operation may be performed once or several times during a predefined period of time, or with a predetermined periodicity, a plurality of cleaning cycles thus being able to be configured. Thus, according to the embodiment chosen, the recognition means 8 contribute to developing an order, from the passenger compartment, for one or more movements, which are sequential or repeated at predefined time intervals, of the fluid distribution assembly 3 between a rest position and a working position. The demands on the driver are thus limited, allowing him to focus his attention on driving. In the same vein, i.e. limiting the demands on the driver, it may be provided to put an end to this repetition of cleaning cycles only when the vehicle comes to a complete stop, such that the control instruction provided by the user is continuous until the vehicle comes to a stop.

Moreover, as illustrated in FIG. 1, it may be provided that the control module 6 of the device according to the invention is configured to receive third items of data D3 originating from means 11 for monitoring one or more driving parameters of the vehicle. By way of non-exhaustive example, these may involve means for monitoring the speed of the vehicle (stoppage of the vehicle, very slow speed, medium or fast speed, stable or unstable speed, etc.), or else means for monitoring the driving mode (vehicle in neutral, straight or non-straight path, etc.). These monitoring means 11 are able to generate one or more third items of data D3 representative of one or more predefined driving situations, and the control module 6 considers this third item of data so as to determine the possibility of a cleaning operation.

It is advantageous for these monitoring means to be implemented in step E2 when, on the basis of the first items of data D1 received from the detection means 5, the control module 6 defines the next requirement for a cleaning operation for the sensor.

In this case, a parallel step (step E3a, shown optionally in dashed lines in FIG. 2) is generated, during which said parameters are monitored so as to deduce therefrom an item of data D3 able to be exploited by the control module and that will condition, according to this embodiment of the invention, the taking into account of the user order such as has been recognized (step E4) so as to implement the cleaning operation (step E5).

In this case, a practical case has been illustrated in which the taking into account of this third item of data D3 by the control module delays the implementation of the cleaning operation until in preferable driving situations, as the user has expressed his desire to perform this cleaning. As a variant, it may be provided that this third item of data D3 is taken into account immediately by the control module and that the information message M1 is broadcast into the passenger compartment only in certain driving situations, for example when the vehicle comes to a stop, so that the user is able to respond to this information message in complete safety.

The device for cleaning an optical sensor according to the invention may be equipped with an assembly for cleaning one or more glazed surfaces 12 that are situated at the front and/or at the rear of the vehicle. According to the invention, it may be provided that the control module 6 is configured to drive the operation of the cleaning assembly 12 in addition to the device for cleaning an optical sensor. In particular, it may be provided that the function for automatically triggering the glazing cleaning assembly is coupled to a function for automatically triggering the cleaning of a sensor. Plus, it may be provided that the control instruction button or lever 10 for sensor cleaning is shared with the one associated with the triggering of the glazing cleaning assembly, and in particular with the triggering of the windshield wipers.

In such a configuration, the supplying of cleaning fluid to the device for cleaning the sensor 2 and the supplying of cleaning fluid to the assembly for cleaning the front and/or rear glazed surface(s) 12 of the vehicle are advantageously performed from a shared cleaning fluid storage tank 13. In this context, the device according to the invention includes monitoring means 14 for monitoring the fluid level in the shared storage tank 13. Advantageously, these monitoring means 14 are able to generate a fourth item of data D4 representative of this level and to transmit this fourth item of data to the control module 6, which is configured to selectively control, depending on a predefined value of this fourth item of data D4, the operation of the device for cleaning an optical sensor and the assembly for cleaning the glazed surface(s).

Figure 3:
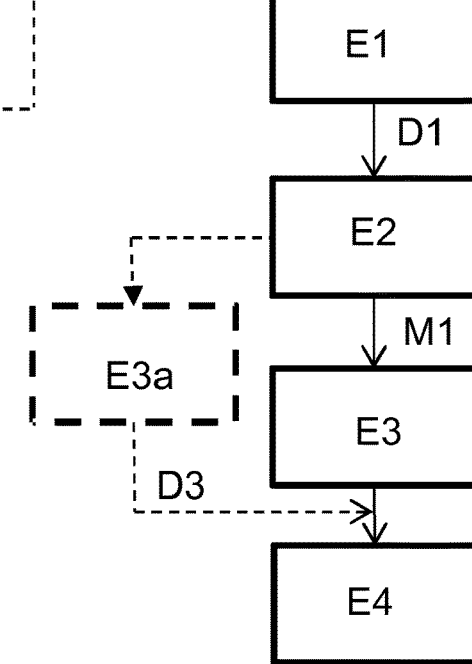
FIG. 3 is a schematic view, in the form of a flowchart, of a cleaning method variant according to the invention.
Figure 3:
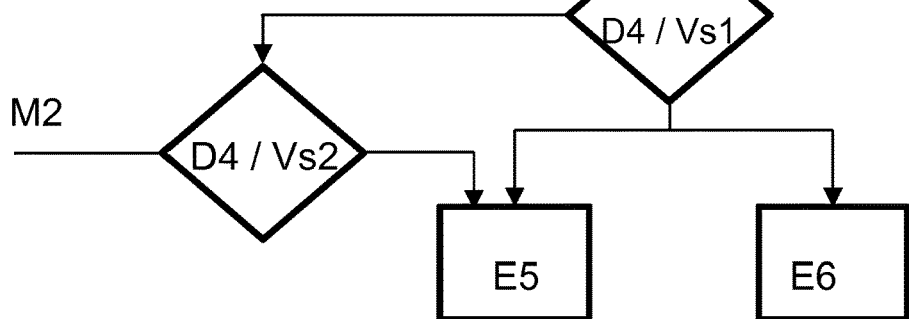

More precisely, and as illustrated in FIG. 3, the invention provides that, if the cleaning fluid level in the shared storage tank 13 falls below a predetermined first threshold value Vs1, the fourth item of data D4 transmitted to the control module 6 signifies that only cleaning of the optical sensor 2 is then able to be performed with the cleaning fluid that is still available in the shared storage tank. At the same time, the invention provides that a message representative of this fourth item of data D4 is generated and displayed in the passenger compartment of the vehicle. Specifically, the cleaning operation for the sensor 2 of the optical detection assembly is then considered to take priority in terms of safety over the cleaning of the glazed surfaces of the vehicle. Advantageously, the invention also provides that, when the liquid level in the shared storage tank 13 falls below a second threshold value Vs2, lower than the abovementioned first threshold value, the monitoring means 14 generate and transmit a fourth item of data representative of this second value to the control module, such that a cleaning operation for the sensor 2 is then not able to be authorized due to the lack of cleaning liquid. At the same time, the invention provides that a corresponding message M2 is displayed in the passenger compartment.

In the embodiments that have just been described, in which the cleaning device according to the invention includes an assembly for cleaning one or more front and/or rear glazed surfaces of the vehicle, the invention includes a step E6 of ordering the cleaning of this glazed surface or of these glazed surfaces, at the same time as the order to clean the sensor 2 of the optical detection assembly. Advantageously, this method also includes a step E7 of monitoring the level of the cleaning liquid in the shared storage tank 13 and, depending on the value taken by the fourth item of data D4 generated by the means 14 for monitoring this level, a conditional ordering of step E6 to clean the glazed surface(s) or of just step E5 to clean the optical sensor.

The invention thus achieves its aim by providing a device and a method for cleaning a sensor 2 of an optical detection system, wherein the cleaning operation is conditional upon prior consent from the driver or from any occupant of the vehicle, on the basis of information relating to the dirtiness of this sensor and/or to the driving situation of the vehicle, which information is transmitted to a control module 6 that is configured to drive both display means in the passenger compartment of the vehicle and the means for cleaning the sensor depending on the detection of the consent from the occupant of the vehicle. The invention thus makes it possible to eliminate driving situations whereby such cleaning could prove inconvenient with regard to a particular driving situation, or simply pointless with regard to the dirtiness of this sensor.

The invention is not limited to the means and configurations described and illustrated, however, but also extends to all equivalent means or configurations and to any combination of such means. In particular, it applies to any type of sensor of an optical detection assembly that is able to be installed on a vehicle.

The invention claimed is:

1. A device for cleaning a sensor on a motor vehicle, the device comprising:
   recognition means configured to:
      in response to an occupant of the motor vehicle receiving an information message representative of a presence of debris on a surface of the sensor by way of a signaling means located in a passenger compartment of the motor vehicle, recognize a control instruction from the occupant of the motor vehicle, and
      output authorization date indicating an authorization from the occupant of the motor vehicle to execute a cleaning operation of the sensor based on the recognizing of the control instruction,
   a fluid distribution assembly configured to distribute fluid onto said sensor during the cleaning operation initiated by operating instructions, and
   a control module in communication with the recognition means, the fluid distribution assembly, the signaling means, and a speedometer of the motor vehicle, the control module configured to:
      analyze sensor date of the sensor to detect the presence of the debris on the surface of the sensor,
      receive motion data representative of a driving speed of the motor vehicle from the speedometer of the motor vehicle,
      instruct the signaling means to generate the information message,
      receive the authorization data from the recognition means, and
      send the operating instructions to the fluid distribution assembly when initiating the cleaning operation,
   wherein the control module activates the recognition means at a same time that the signaling means generate the information message, wherein the same time may only be when the motion data representative of the driving speed of the motor vehicle indicates that the driving speed is zero.

2. The device as claimed in claim 1, wherein the sensor is an image sensor of an optical detection system of the motor vehicle, the image sensor configured to:
   detect the presence of the debris, and
   send the sensor data to the control module.

3. The device as claimed in claim 1, wherein the recognition means comprises a button that is actuated by the occupant of the motor vehicle.

4. The device as claimed in claim 1, wherein the recognition means comprises gesture recognition and/or voice recognition technology.

5. The device as claimed in claim 1, wherein the speedometer continuously communicates the motion data representative of the driving speed of the motor vehicle to the control module.

6. The device as claimed in claim 1, wherein the fluid distribution assembly is further configured to clean a front and/or a rear glazed surface of the motor vehicle.

7. The device as claimed in claim 6, further comprising: a fluid storage tank shared with the fluid distribution assembly for cleaning the front and/or the rear glazed surface.

8. The device as claimed in claim 7, wherein the control module is in further communication with a fluid level sensor in the fluid storage tank, and wherein the operating instructions sent by the control module to the fluid distribution assembly are further based on a predefined value of a fluid level in the fluid storage tank detected by the fluid level sensor.

9. The device as claimed in claim 1, wherein after the control module receives the authorization data from the recognition means, the control module generates the operating instructions to require a plurality of cleaning cycles by way of the fluid distribution assembly, sequentially or at predefined time intervals.

10. The device as claimed in claim 1, wherein the information message is a text message displayed by the signaling means.

11. A method for cleaning a sensor of an optical detection system of a motor vehicle, wherein a fluid distribution assembly is moved between a rest position and a working position in which a fluid is able to be distributed onto a surface of the sensor during a cleaning operation of the sensor, the method comprising:

- detecting, at a control module, a presence of debris on the surface of the sensor;
- determining, at the control module, a driving speed of the motor vehicle based on motion data received from a speedometer of the motor vehicle;
- simultaneously activating a recognition means and a signaling means using first and second activation commands sent by the control module to the recognition means and the signaling means at a same time, wherein the same time may only be when the motion data indicates that the driving speed is zero;
- generating and displaying, at the signaling means in a passenger compartment of the motor vehicle, an information message representative of the presence of the debris on the surface of the sensor;
- recognizing an order, at the recognition means, the order indicating an authorization of the cleaning operation of the sensor and issued by an occupant situated in the passenger compartment of the motor vehicle, the order issued in response to the signaling means generating and displaying the information message representative of the presence of the debris on the surface of the sensor;
- transmitting, to the control module, the order indicating the authorization of the cleaning operation of the sensor; and
- activating, using a third activation command sent by the control module, the fluid distribution assembly upon receiving the order at the control module.

12. The method as claimed in claim 11, further comprising: continuously generating the motion data representative of the driving speed of the motor vehicle using the speedometer, and continuously transmitting the motion data to the control module.

13. The method as claimed in claim 11, further comprising:

- monitoring, with a fluid level sensor, a fluid level of a shared storage tank, the shared storage tank configured to store the fluid used to clean a front and/or a rear glazed surface of the motor vehicle and to clean the sensor;
- generating, with the fluid level sensor, fluid level data representative of the fluid level in the shared storage tank; and
- transmitting the fluid level data to the control module;
- wherein the third activation command is only transmitted by the control module to the fluid distribution assembly upon the fluid level data received by the control module indicating the fluid level in the shared storage tank is at or above a predetermined threshold level.

* * * * *

UNITED STATES PATENT AND TRADEMARK OFFICE
CERTIFICATE OF CORRECTION

PATENT NO. : 11,273,798 B2
APPLICATION NO. : 16/094096
DATED : March 15, 2022
INVENTOR(S) : Frédéric Giraud Page 1 of 1

It is certified that error appears in the above-identified patent and that said Letters Patent is hereby corrected as shown below:

In the Claims

Column 8, Claim 1, Line 5, the word "date" should read -- data --.

Column 8, Claim 1, Line 16, the word "date" should read -- data --.

Signed and Sealed this
Tenth Day of May, 2022

Katherine Kelly Vidal
*Director of the United States Patent and Trademark Office*